(12) United States Patent
Rong et al.

(10) Patent No.: US 10,297,402 B2
(45) Date of Patent: May 21, 2019

(54) MAGNETIC PULSE INDUCTED TRANSFER-TYPE DC CIRCUIT BREAKER

(71) Applicant: XI'AN JIAOTONG UNIVERSITY, Xi'an, Shaanxi (CN)

(72) Inventors: Mingzhe Rong, Xi'an (CN); Yi Wu, Xi'an (CN); Yifei Wu, Xi'an (CN); Fei Yang, Xi'an (CN); Chunping Niu, Xi'an (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 210 days.

(21) Appl. No.: 15/493,287

(22) Filed: Apr. 21, 2017

(65) Prior Publication Data
US 2018/0137993 A1    May 17, 2018

(30) Foreign Application Priority Data
Nov. 11, 2016   (CN) .................... 2016 1 09933287

(51) Int. Cl.
*H01H 9/54*     (2006.01)
*H01H 33/59*    (2006.01)
(Continued)

(52) U.S. Cl.
CPC ............ *H01H 9/54* (2013.01); *H01H 33/596* (2013.01); *H02H 3/05* (2013.01); *H02H 3/087* (2013.01); *H02H 3/021* (2013.01)

(58) Field of Classification Search
None
See application file for complete search history.

(56) References Cited

U.S. PATENT DOCUMENTS

| 5,379,014 A | 1/1995 | Sato et al. |
| 2004/0070913 A1* | 4/2004 | Macanda ................ H01T 4/12 361/120 |

(Continued)

FOREIGN PATENT DOCUMENTS

| CN | 105281289 | 1/2016 |
| CN | 106300308 | 1/2017 |
| CN | 206117139 | 4/2017 |

OTHER PUBLICATIONS

1st Office Action from SIPO for Chinese Patent Application No. 2016109933287.

(Continued)

*Primary Examiner* — Jared Fureman
*Assistant Examiner* — Aqeel H Bukhari
(74) *Attorney, Agent, or Firm* — Dragon Sun Law Firm, PC; Jinggao Li, Esq.

(57) ABSTRACT

The present invention discloses a magnetic pulse inducted transfer-type DC circuit breaker. The DC circuit breaker comprises a main current circuit and a transfer current circuit, the main current circuit comprising a combination of a fast mechanical switch or a mechanical switch with a power electronic device; the transfer current circuit comprises an arrester and a mutual inductor. The voltage generated through a mutual inductor may directly transfer current to the arrestor, thereby eliminating a process of transfer of the current to the capacitor or a power electronic device; it has a high current limiting or breaking speed, with a stability far superior to traditional technologies. The isolation between the capacitance charging unit and the DC system significantly reduces the voltage level and size of the charging unit, and enhances action reliability. The power semiconductor devices or trigger gaps are used at the primary side of the mutual inductor of the transfer current (Continued)

circuit form a bridge circuit, thereby realizing bidirectional current transfer; the bridge circuit is voltage-withstanding and low-cost.

7 Claims, 6 Drawing Sheets

(51) Int. Cl.
 *H02H 3/087* (2006.01)
 *H02H 3/05* (2006.01)
 *H02H 3/02* (2006.01)

(56) References Cited

U.S. PATENT DOCUMENTS

2012/0281327 A1* 11/2012 Duan .................. H02H 1/04
 361/93.7
2014/0078622 A1* 3/2014 Crane .................. H02H 3/087
 361/8

OTHER PUBLICATIONS

Search report from SIPO for Chinese Patent Application No. 2016109933287.

* cited by examiner

MAGNETIC PULSE INDUCTED TRANSFER-TYPE DC CIRCUIT BREAKER

FIELD OF THE INVENTION

The present invention relates to the field of high-and-medium-voltage circuit breakers, and more specifically relates to a magnetic pulse inducted transfer-type DC circuit breaker.

BACKGROUND OF THE INVENTION

With constant increase of the capacity of DC power systems, DC transmission and transformation technologies are developed vigorously. This demands a higher system stability and security. Among various faults possibly occurring to a power system, short-circuit fault is most hazardous to the power grid and has a high probability to occur. Short-circuit of DC systems will cause a current peak to rise to a very high level is a short time. Therefore, short-circuit cutoff and protection is an important issue in the development of DC systems. Difficulties in DC breaking are mainly manifested in two aspects. One aspect is that a DC does not have a natural zero crossing point like an AC, such that it is very difficult for current to pass through zero point and a current zero crossing points needs to be artificially created. The second aspect is that a DC breaker has to absorb tremendous energy during separation of the short-circuit current. A currently common solution is to effectuate current breaking by establishing a reverse voltage through a transfer capacitor or an electronic device that can be turned off. The transfer capacitor scheme mainly has a large size but a long small-current separating time and needs a complex charging-discharging device, while the full-controlled power electronic device scheme mainly has a complex control and a high cost and needs a complicated water-cooling system. Therefore, the followings have become core issues that restrict development of circuit breakers: how to simplify the structure of a DC circuit breaker, reduce cost and size, improve transfer efficiency, and effect fast breaking of different levels of current.

SUMMARY OF THE INVENTION

In view of the drawbacks existing in the prior art, the present invention provides a magnetic pulse inducted transfer-type DC circuit breaker, the circuit breaker comprising a main current circuit, a transfer current circuit, and an access port.

The main current circuit comprises one or more of a mechanical switch, a power electronic device, and a current limiter which are connected in series or parallel, for continuously bearing current or temporarily conducting current.

The transfer current circuit, which is for bearing current transferred from the main current circuit, comprises a first circuit and a second circuit; the first circuit comprises a secondary-side inductor and an arrestor that are connected in series; the second circuit comprises a third circuit that includes a pre-charging capacitor and an inductor which are connected in series; the second circuit further comprises a first power semiconductor device, a second power semiconductor device, a third power semiconductor device, a fourth power semiconductor device, and a primary-side inductor; the first to fourth power semiconductor devices and the third circuit form a bridge circuit that is connected in series with the primary-side inductor; the primary-side inductor and the secondary-side inductor form a mutual inductor; the access port is for connecting to an external system.

Preferably, the mechanical switch comprises one of a common mechanical switch based on a spring mechanism, a high-speed mechanical switch based on electromagnetic repulsion, a mechanical switch based on a high-speed motor drive, and a high-speed mechanical switch based on explosion drive; the current limiter comprises one of a superconducting fault current limiter, a liquid metal current limiter, and a PTC current limiter.

Preferably, the arrestor comprises one or more of a zinc-oxide arrestor, a tube-type arrestor, or a valve-type arrestor.

Preferably, the first circuit is connected in parallel to the main current circuit, and the second circuit and the first circuit are isolated or not isolated therebetween.

Preferably, the primary-side inductor and the secondary-side inductor, which are hollow inductors or inductors with magnetic cores, comprising one inductor or more inductors connected in series or in parallel.

Preferably, the first to fourth power semiconductor devices and the third circuit form a bridge circuit; the bridge circuit is connected in series with the primary-side inductor with a connection relationship as follows: the first power semiconductor device is serially connected with the second power semiconductor device; the third power semiconductor device is serially connected with the fourth power semiconductor device; between the first power semiconductor device and the second power semiconductor device is disposed a first endpoint; between the third power semiconductor device and the fourth power semiconductor device is disposed a second endpoint; the third circuit is connected between the first endpoint and the second endpoint; a first end of the first power semiconductor device is connected to a first end of the primary-side inductor and a first end of the third power semiconductor device; a second end of the first power semiconductor device is connected to a first end of the second power semiconductor device and a first end of the third circuit; a second end of the third circuit is connected to a second of the third power semiconductor device and connected to a first end of the fourth power semiconductor device; a second end of the second power semiconductor device is connected to a second end of the primary-side inductor and a second end of the fourth power semiconductor device.

Preferably, the first to fourth power semiconductor devices comprise: one or more of a power diode, a thyristor, an IGBT, and an IGCT which are combined in series and parallel.

The present invention has the following advantageous effects:

1) The voltage generated through a mutual inductor may directly transfer current to the arrestor, thereby eliminating a process of transfer of the current to the capacitor or a power electronic device; it has a high current limiting or breaking speed, with stability far superior to traditional technologies.

2) The isolation implemented between the capacitance charging unit and the DC system, significantly reduces the voltage level and size of the charging unit, and enhances action reliability.

3) The power semiconductor devices or trigger gaps are used at the primary side of the mutual inductor of the transfer current circuit form a bridge circuit, thereby realizing bidirectional current transfer; the bridge circuit is voltage-withstanding and low-cost.

BRIEF DESCRIPTION OF THE ACCOMPANYING DRAWINGS

Hereinafter, the preferred embodiments of the present invention will be described in further detail with reference to the accompanying drawings.

DETAILED DESCRIPTION OF THE PREFERRED EMBODIMENTS

To enable those skilled in the art to better understand solutions of the present invention. Hereinafter, the technical solutions in the embodiments of the present invention will be described in a clear and comprehensive manner in conjunction with FIGS. 1-13 in the embodiments of the present invention. Apparently, the embodiments as described are only part of embodiments of the present invention, rather than all embodiments. Based on the embodiments in the present invention, all other embodiments obtained by a person of normal skill in the art without exercise of inventive work should fall within the scope of the present invention.

The detailed depiction below is actually only exemplary, not intended to be restrained by any explicit or implied theories presented in the above technical field, background, summary or the detailed description below. Unless otherwise described explicitly, the word "comprise" and its various transformations should be understood as implicitly including the components, but not excluding any other exponents.

In one embodiment, the present disclosure discloses a magnetic pulse inducted transfer-type DC circuit breaker, the circuit comprises a main current circuit, a transfer current circuit, and a access port;

The main current circuit is for continuously bearing current or temporarily conducting current;

The transfer current circuit is for bearing current transferred from the main current circuit;

The access port is for connecting to an external system.

In the present embodiment, fast transfer and breaking of current is implemented by serial connection between inductors and an arrestor, which eliminates a process of establishing a voltage using a capacitor or a power electronic device to transfer system current to the arrestor. By controlling discharging of a mutual inductor primary-side capacitor isolated from the DC system, a pulse current is generated; meanwhile, a mutual inductor secondary-side connected to the DC system inducts a high voltage to conduct the arrestor to form a pulse current; this pulse current is utilized to resist current of the main current circuit such that the current is transferred from the main current circuit to the transfer circuit including an arrestor and a mutual inductor, thereby implementing current breaking or limitation using the arrestor. It is easily understood that in the art, the circuit breaker may also comprise a control system or a controller so as to control on and off of relevant components in the circuit breaker.

In one embodiment, the main current circuit comprises one of a mechanical switch, a power electronic device, and a current limiter, or more of them connected in series or parallel.

In one embodiment, the main current circuit may continuously bearing or temporarily conducting current. The main current circuit comprises one of a mechanical switch, a power electronic device, a current limiter, and a wire, or more of the combined in series-parallel; the main current circuit, as a transferred part in the transfer circuit of the present disclosure, has its both end led out with an access port of the present disclosure for an externa system.

In one embodiment, the transfer current circuit comprises a first circuit and a second circuit;

the first circuit comprises a secondary-side inductor and an arrestor that are connected in series;

the second circuit comprises a pre-charging capacitor, an inductance, thyristors B1-B4 and a primary-side inductor;

the pre-charging capacitor and the inductance are connected in series to form a third circuit A3;

the thyristors B1 to B4 include a power conductor or a trigger gap;

the thyristors B1 to B4 are connected in series to form a loop that is then connected in series with the primary-side inductor;

the thyristors B1 to 34 and the third circuit A3 form a bridge circuit;

the primary-side inductor and the secondary-side inductor form a mutual inductor.

Of course, the thyristor may be replaced by a power diode, an IGBT, or an IGCT.

In the present embodiment, the transfer current circuit has a capacity of bearing the current transferred from the main current circuit, comprising a first circuit formed by a secondary-side inductor and an arrestor connected in series; a third circuit A3 formed by a pre-charging capacitance or an inductance, and a second circuit formed by serial connection of B1-B4 consisting of power semiconductor devices or trigger gaps with the primary-side inductor L0; the primary-side inductor and the secondary-side inductor form a mutual inductor; the first circuit is connected in parallel to the main current circuit; the second circuit may be insulated from the first circuit, or may not be insulated therefrom.

Dependent on different current directions, in order to implement transfer of bidirectional current, power semiconductor devices or trigger gaps are utilized at the primary side of the mutual inductor of the transfer current circuit to form a bridge circuit.

Before current transfer, the current flows through the mechanical switch A1 in the main current circuit; at this point, the power electronic device, trigger switch device, and thyristors 131 to B4 in the transfer current circuit are in a breaking state and no current flows through the first circuit and the second circuit in the transfer current circuit.

In one embodiment, the first circuit is connected in parallel to the main current circuit, and insulation or non-insulation is selected between the second circuit and the first circuit.

Further, the primary-side inductor and the secondary-side inductor, which are hollow inductors or inductors with magnetic cores, are formed by one or more inductances connected in series or in parallel.

Further, the arrestor comprises one of a zinc-oxide arrestor, a tube-type arrestor, or a valve-type arrestor, or more them in series-parallel connection.

Further, the mechanical switch comprises one of a common mechanical switch based on a spring mechanism, a high-speed mechanical switch based on electromagnetic repulsion, a mechanical switch based on a high-speed motor drive, and a high-speed mechanical switch based on explosion drive.

The current limiter comprises one of a superconducting fault current limiter SFCL, a liquid metal fault current limiter LMFCL, and a PTC current limiter.

Further, the power semiconductor devices comprise: one or more of a power diode, a thyristor, an IGBT, and an IGCT which are combined in series and parallel.

In one embodiment, in a normal working state, current in the circuit flows through the main current circuit; at this point, the arrestor and thyristors B1 to B4 in the transfer current circuit are in a turned on state, and no current flows in the first and second circuits.

When the magnetic pulse inducted transfer-type DC circuit breaker needs to act, whether the power semiconductor devices or trigger gaps in the transfer current circuit and the mechanical switch and power semiconductor devices in the main current circuit need to act and corresponding action sequences are determined by measuring a current amplitude and variation ratio of the main current circuit.

Hereinafter, a working process of a circuit breaker of the present disclosure will be described exemplarily, comprising steps of:

S1: determining occurrence of a short-circuit fault according to a current amplitude and variation ratio of a main current circuit or according to an external transfer instruction as received, and issuing an opening signal to a mechanical switch in the main current circuit;

S2: conducting, according to a current flow direction, any two thyristors of thyristors B1 to B4 so as to form a discharging loop with a third circuit A3 and an inductance; at this time, generating a rising voltage at both ends of a secondary-side inductor till the arrestor is on, and current in the main current circuit gradually transferring to a first circuit;

S3: After the current in the main current circuit is completely transferred, establishing a voltage at both ends of the arrestor, thereby capable of performing a current limiting or separating function.

The inducted current transfer method according to the present embodiment may implement a plurality of engineer application functions, e.g., a DC circuit breaker, an AC fast circuit breaker, an AC/DC limiter. On one hand, the present disclosure may directly transfer a main loop current to an arrestor to directly establish a breaking voltage to implement current breaking and limiting, which eliminates an intermediate process in which the main loop current is transferred to a capacitor or a power electronic device. Meanwhile, a mutual inductor primary-side capacitance charging unit is isolated from a DC system, which significantly reduces a voltage level and size of a charging unit and enhances reliability of breaking. Besides, by forming a bridge circuit using power semiconductor devices or trigger gaps at a primary side of the mutual inductor of the transfer current circuit, two-way current transfer may be implemented. The bridge circuit withstands voltage and has a low cost. The inducted current transfer method of the present disclosure has a simple circuit, less components, and a short response time; therefore, it enhances sensitivity and reliability of practical applications.

Figure 1:
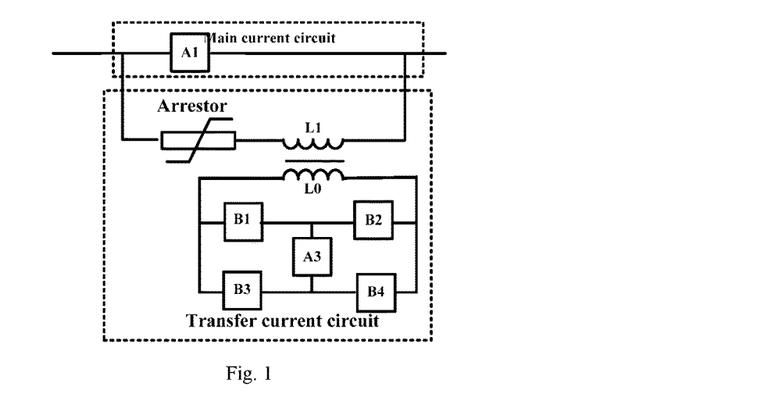
FIG. 1 shows a structural schematic diagram of a magnetic pulse inducted transfer-type DC circuit breaker according to one embodiment of the present disclosure.
Figure 2:
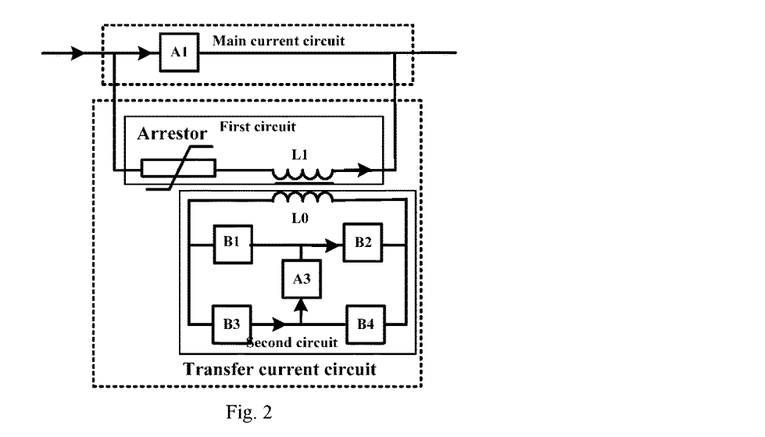
FIG. 2 shows a structural schematic diagram of a magnetic pulse inducted transfer-type DC circuit breaker when working unidirectionally according to one embodiment of the present disclosure.
Figure 3:
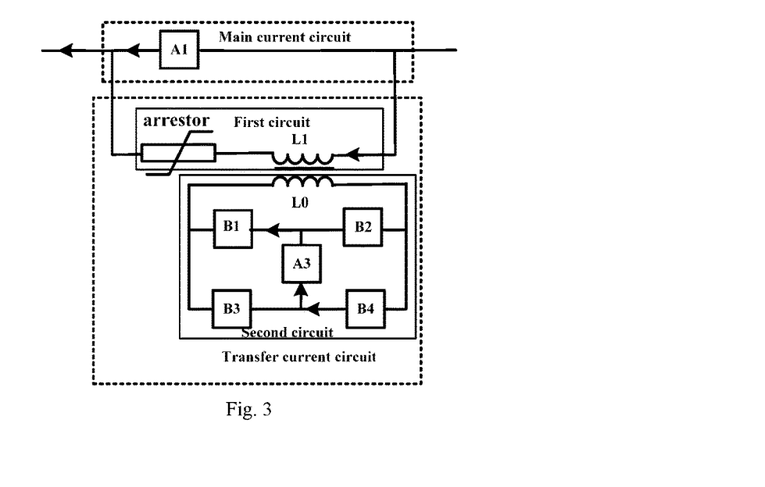
FIG. 3 shows structural schematic diagram of a magnetic pulse inducted transfer-type DC circuit breaker when working unidirectionally according to another embodiment of the present disclosure.

In one embodiment, the present disclosure discloses a magnetic pulse inducted transfer-type DC circuit breaker. FIG. 1 shows a structural schematic diagram of a magnetic pulse inducted transfer-type DC circuit breaker according to one embodiment of the present disclosure, comprising a main current circuit and a transfer current circuit. In order to better illustrate a working procedure of the transfer circuit, the present disclosure provides a direction diagram of a DC current flowing in and out of the present disclosure according to a certain direction, as shown in FIG. 2. A possible current direction of the power semiconductor devices in FIG. 2 is consistent with arrow directions of the mechanical switch A1 and thyristors B2 and B3 in the figure. FIG. 3 provides a schematic diagram of a DC current flowing in and out of the present disclosure according to another direction.

Refer to the magnetic pulse inducted transfer-type DC circuit breaker as shown in FIGS. 1, 2, and 3. The magnetic pulse inducted transfer-type DC circuit breaker comprises a main current circuit, a transfer current circuit, and a port connected to an external system, the main current circuit being connected in parallel to the transfer current circuit.

The main current circuit comprises one of a mechanical switch, a power electronic device and a current limiter, or more of them connected in series-parallel.

The transfer current circuit comprises a first circuit consisting of a secondary-side inductor L1 and an arrestor connected in series, a third circuit A3 consisting of a pre-charging capacitance or a superconducting inductance, a second circuit consisting of B1-B4, which are formed by power semiconductor devices or trigger gaps, and a primary-side inductor L0 in serial connection, the primary-side inductor and the secondary-side inductor forming a mutual inductor, the first circuit and the main current circuit being connected in parallel, wherein the second circuit and the first circuit may be insulated.

Dependent on different current directions, in order to implement two-way current transfer, power semiconductors or trigger gaps are used to form a bridge circuit at the primary side of the mutual inductor of the transfer current circuit.

In a normal working state, current flows through a mechanical switch A1 in the main current circuit; at this point, in the transfer current circuit, the power electronic device, triggered switch device, and thyristors B1 to B4 are in a conducted state, and no current flows through the first circuit and the second circuit in the transfer current circuit.

When the magnetic pulse inducted transfer-type DC circuit breaker is applied to a DC circuit breaker and needs to transfer current, by measuring a current amplitude and variation ratio of the main current circuit, whether the power semiconductor devices or trigger gaps in the transfer current circuit, the mechanical switch in the main current circuit and the power semiconductor devices act, and corresponding action sequences are determined.

Particularly, the mechanical switch may be a common mechanical switch based on a spring mechanism, a high-speed mechanical switch based on electromagnetic repulsion, a mechanical switch based on a high-speed motor drive, or a high-speed mechanical switch based on explosion drive; the current limiter includes, but not limited to, a superconducting fault current limiter SFCL, a liquid metal fault current limiter LMFCL, and a PTC current limiter; and the power semiconductor devices comprise, but not limited to, one or more of a power diode, a thyristor, an IGBT, and an IGCT which are combined in series or parallel.

In particular, the primary-side inductor and the secondary-side inductor that form a mutual inductor are hollow inductors or magnetic core-contained inductors; the primary side and the secondary side may adopt one or more inductances connected in series or in parallel. The power electronic devices or trigger gaps B1-B4 of the second circuit of the transfer current circuit form a bridge circuit.

Figure 4:
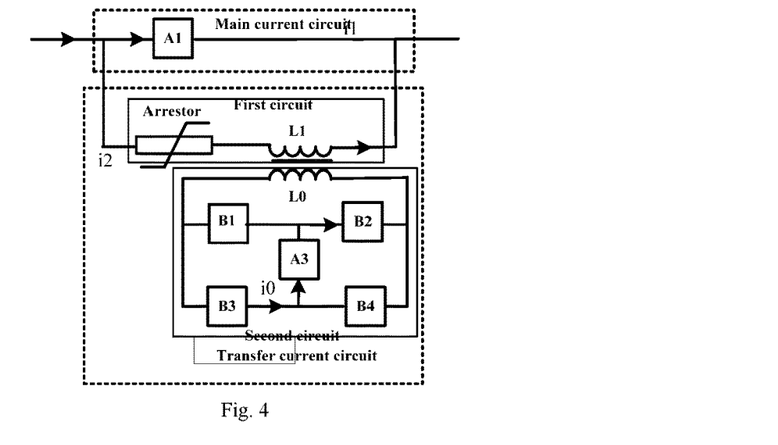
FIG. 4 shows a schematic diagram of a current flag of a magnetic pulse inducted transfer-type DC circuit breaker according to one embodiment of the present disclosure.

FIG. 4 illustrates current flags of respective branches of the transfer current circuit, where i0 is current flowing through the third circuit A3 and the primary-side inductor L0 in the second circuit of the transfer current circuit, i1 is current flowing through the main current circuit, and i2 is current flowing through the secondary-side inductor L1 in the first circuit of the transfer current circuit.

Figure 5A:
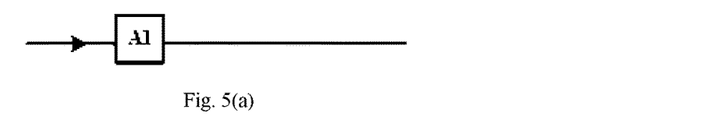
FIGS. 5(a)-5(c) are current flow direction diagrams of respective circuits when a magnetic pulse inducted transfer-type DC circuit breaker transfers current according to one embodiment of the present disclosure.
Figure 5B:
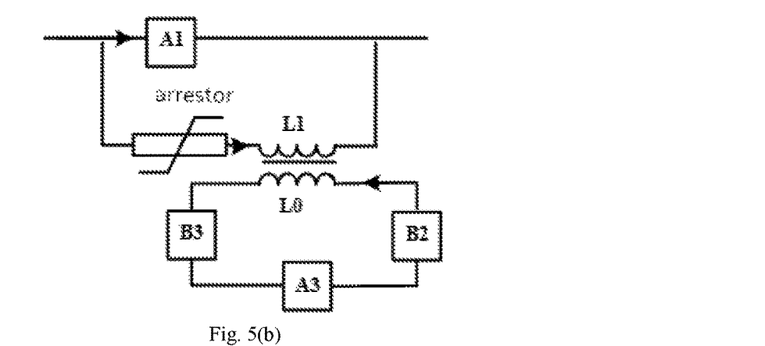
Figure 5C:
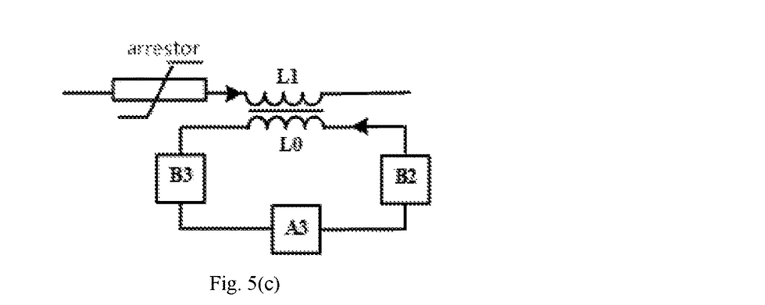
Figure 6:
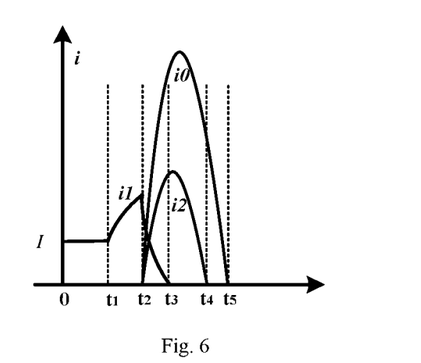
FIG. 6 shows a current change curve diagram in respective circuits when a magnetic pulse inducted transfer-type DC circuit breaker corresponds to current transfer in FIG. 5 according to one embodiment of the present disclosure.

In a main current circuit, with current flowing from left to right as an example, FIG. 5 illustrates current directions of respective branches during current transfer, specifically respective branch current directions corresponding times t1 to t5. FIG. 6 provides current change curves of respective branches.

Figure 9:
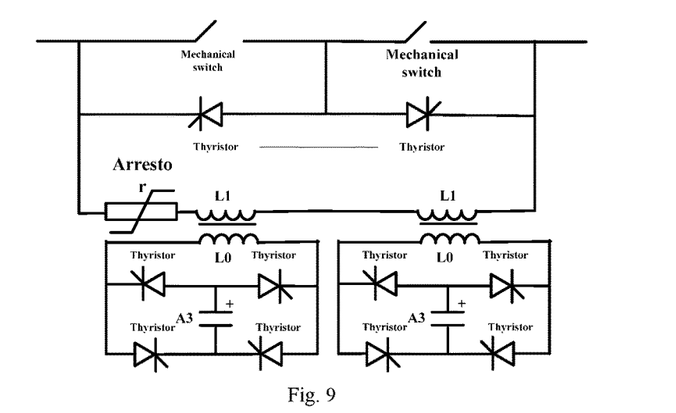
Figure 10:
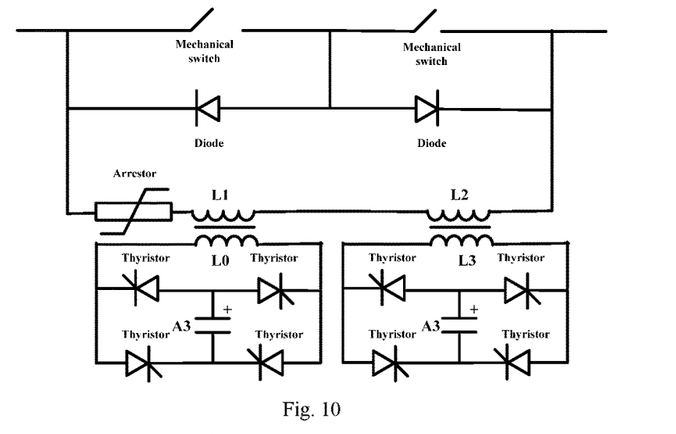
Figure 11:
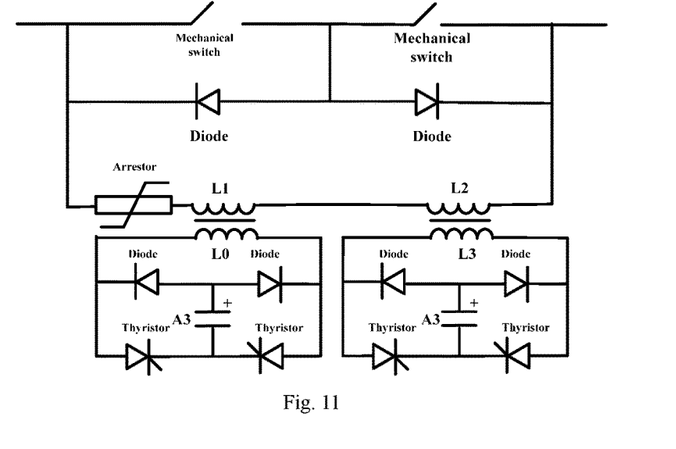
Figure 12:
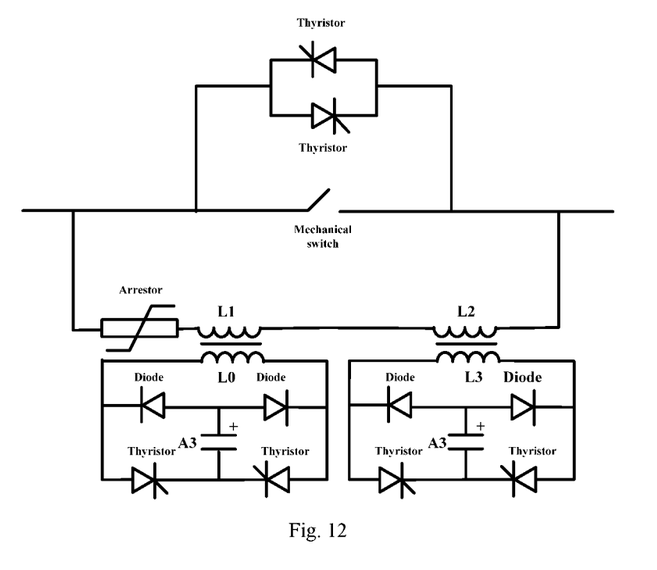
Figure 13:
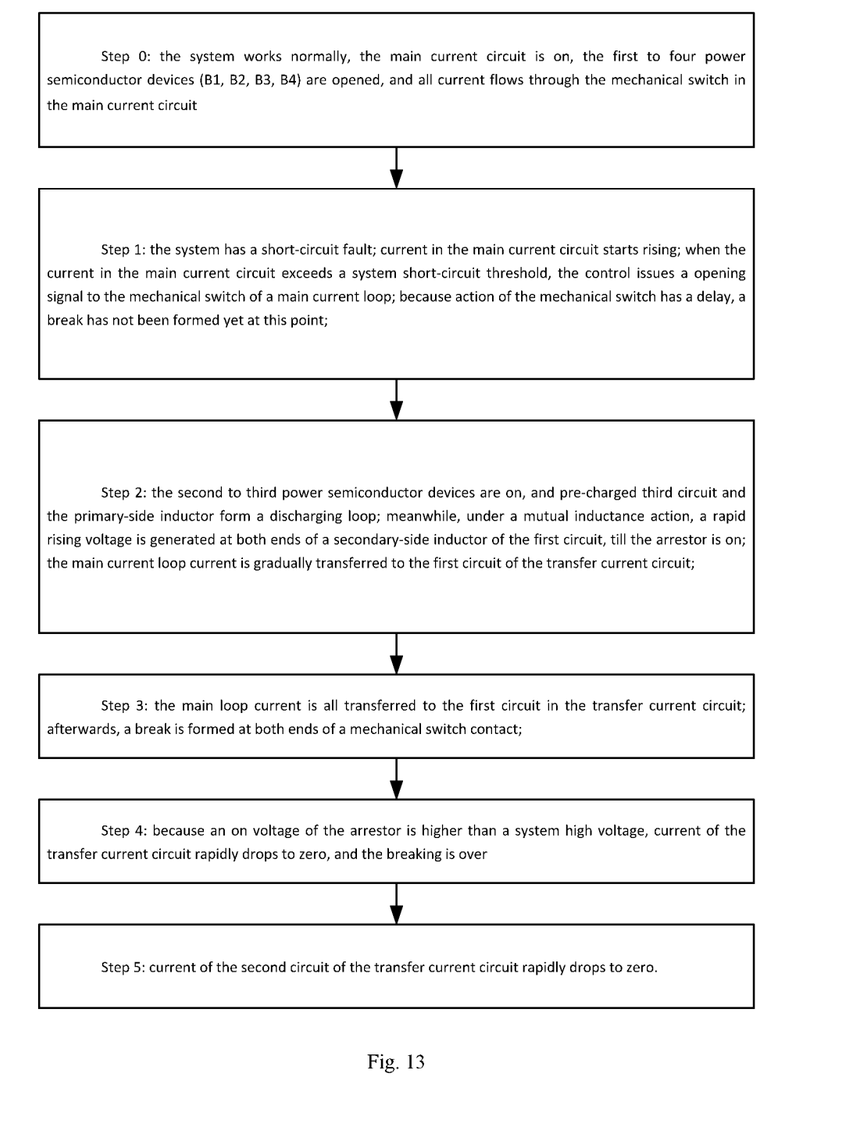
FIG. 13 is step diagram of a separating method of a bidirectionally separating hybrid circuit breaker in one embodiment of the present disclosure.

In one embodiment, as illustrated in FIG. 9, use of the magnetic pulse inducted transfer-type DC circuit breaker comprises steps below.

In step S1, issuing an opening signal to a mechanical switch A1 of a main current loop. Because a mechanic switch action has a delay, a break has not been formed yet.

In step S2, according to a current flow direction, transmitting, by a controller, an on signal to two of bridge-type thyristors B2-B4 in a second circuit of the transfer current circuit. A third circuit A3 and a primary-side inductor L0 form a discharging loop. Meanwhile, due to an induction action, a rapidly rising voltage is generated at both ends of the secondary-side inductor L1 of the first circuit till on of an arrestor. Current of the main current loop is gradually transferred to a first circuit of the transfer current circuit. After a while, all current is transferred to the first circuit of the transfer current circuit. Afterwards, a break is formed between mechanical switch contacts.

In step S3, after the current is completely transferred, a certain voltage being established at both ends of the arrestor, which may implement a current limiting or separating function.

In one embodiment, referring to FIG. 9, specific operation steps of a DC circuit breaker constructed by a magnetic pulse inducted transfer-type DC circuit breaker comprises a plurality of aspects as follows, with current entering from the left and existing from the right of a main current circuit as an example:

a system works normally; a mechanical switch is closed; thyristors are turned on; all current flows through the mechanical switch in the main current circuit, as shown in FIG. 5(a), wherein a system rated current is I.

At time t1, the system has a short-circuit fault; current of the main current circuit begins rising; between t0 and t1, when the rising current exceeds a system short-circuit threshold, the controller issues an opening signal to the mechanical switch A1 of the main current loop. Because action of the mechanical switch has a delay, a break has not been formed yet.

At time t2, thyristors B2 and B3 are conducted; a pre-charged capacitor A3 and a primary-side inductor L0 form a discharging loop. Meanwhile, due to induction action, a rapidly rising voltage is generated at both ends of the inductance L1 of the first circuit, till conduction of the arrestor. Current of the main current loop is gradually transferred to the first circuit of the transfer current circuit.

At time t3, all current of the main loop is transferred to the first circuit of the transfer current circuit, as shown in FIG. 5(c). Afterwards, a break is formed at both ends of the mechanical switch contact.

At time t4, because the on voltage of the arrestor is higher than the system voltage, the current in the transfer current circuit rapidly drops to zero, the breaking is over.

At time t5, the current of the second circuit of the transfer current circuit is zero.

Figure 7:
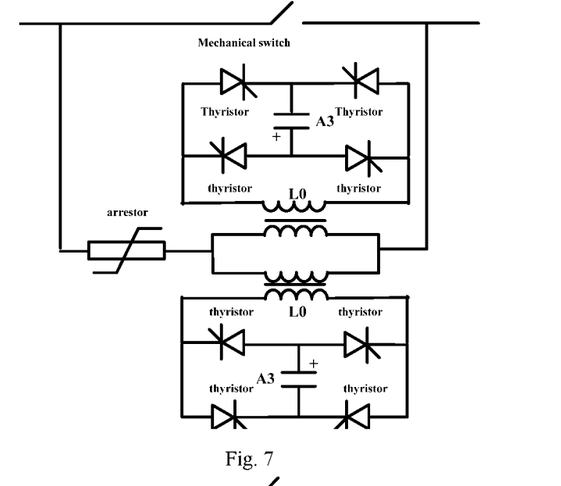
FIGS. 7-12 are diagrams of a magnetic pulse inducted transfer-type DC circuit breaker according to one embodiment of the present disclosure.
Figure 8:
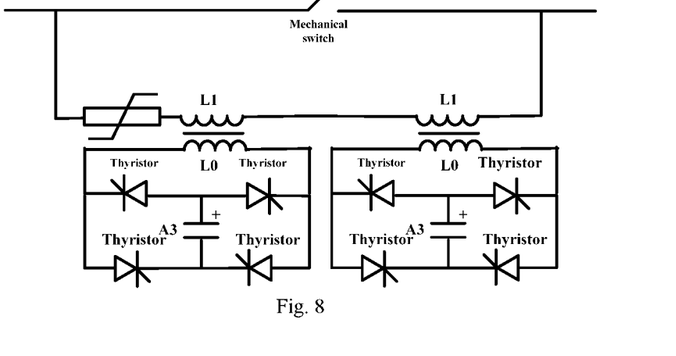

In the present disclosure, it is not required that the transfer current circuit only include one mutual inductor; it is allowed that a plurality of mutual inductors are combined serially or in parallel with the primary-side circuit, as shown in FIGS. 7 and 8.

The transfer circuit disclosed in the present embodiment comprises a main current circuit and a transfer current circuit. The transfer current circuit comprises a mutual inductor. With the transfer current circuit, rapid current transfer may be implemented, thereby realizing current limiting or separating. Meanwhile, the capacitor in the second circuit is isolated from the DC system, such that the voltage level and size of the charging unit may be significantly reduced, which enhances reliability of transfer.

The content above is a further detailed depiction of the present invention in conjunction with specific preferred embodiments. It should not be regarded that the preferred embodiments of the present invention are limited thereto; to those skilled in the art, several simple deductions or substitutions may also be made without departing from the idea of the present invention, which should be regarded as falling within the protection scope determined by the submitted claims.

The invention claimed is:

1. A magnetic pulse inducted transfer-type DC circuit breaker, characterized in that the circuit breaker comprising a main current circuit, a transfer current circuit, and an access port;

the main current circuit comprises one or more of a mechanical switch, a power electronic device, and a current limiter which are connected in series or parallel, for continuously bearing current or temporarily conducting current;

the transfer current circuit, which is for bearing current transferred from the main current circuit, comprises a first circuit and a second circuit; the first circuit comprises a secondary-side inductor (L1) and an arrestor that are connected in series; the second circuit comprises a third circuit (A3) that includes a pre-charging capacitor and an inductor which are connected in series; the second circuit further comprises a first power semiconductor device (B1), a second power semiconductor device (B2), a third power semiconductor device (B3), a fourth power semiconductor device (B4), and a primary-side inductor L0); the first to fourth power semiconductor devices (B1, B2, B3, B4) and the third circuit (A3) form a bridge circuit that is connected in series with the primary-side inductor (L0);

the primary-side inductor (L0) and the secondary-side inductor (L1) form a mutual inductor;

the access port is for connecting to an external system.

2. The DC circuit breaker according to claim 1, characterized in that preferably, the mechanical switch comprises one of a common mechanical switch based on a spring mechanism, a high-speed mechanical switch based on electromagnetic repulsion, a mechanical switch based on a high-speed motor drive, and a high-speed mechanical switch based on explosion drive;

the current limiter comprises one of a superconducting fault current limiter (SFCL), a liquid metal current limiter (LMCL), and a PTC current limiter.

3. The DC circuit breaker according to claim 1, characterized in that the arrestor comprises one or more of a zinc-oxide arrestor, a tube-type arrestor, or a valve-type arrestor.

4. The DC circuit breaker according to claim 1, characterized in that the first circuit is connected in parallel to the main current circuit, and the second circuit and the first circuit are insulated or not insulated therebetween.

5. The DC circuit breaker according to claim 1, characterized in that the primary-side inductor (L0) and the secondary-side inductor (L1), which are hollow inductors or inductors with magnetic cores, comprising one inductor or more inductors connected in series or in parallel.

6. The DC circuit breaker according to claim 1, characterized in that the first to fourth power semiconductor devices (B1, B2, B3, B4) and the third circuit (A3) form a bridge circuit; the bridge circuit and the primary-side inductor (L0) have relationships as follows:

the first power semiconductor device (B1) is serially connected with the second power semiconductor device (B2); the third power semiconductor device (B3) is serially connected with the fourth power semiconductor device (B4); between the first power semiconductor device (B1) and the second power semiconductor device (B2) is disposed a first endpoint; between the third power semiconductor device (B3) and the fourth power semiconductor device (B4) is disposed a second endpoint; the third circuit (A3) is connected between the first endpoint and the second endpoint;

a first end of the first power semiconductor device (B1) is connected to a first end of the primary-side inductor (L0) and a first end of the third power semiconductor device (B3);

a second end of the first power semiconductor device (B1) is connected to a first end of the second power semiconductor device (B2) and a first end of the third circuit (A3);

a second end of the third circuit (A3) is connected to a second of the third power semiconductor device (B3) and connected to a first end of the fourth power semiconductor device (B4);

a second end of the second power semiconductor device (B2) is connected to a second end of the primary-side inductor (L0) and a second end of the fourth power semiconductor device (B4).

7. The DC circuit breaker according to claim 1, characterized in that the first to fourth power semiconductor devices (B1, 32, B3, B4) comprise: one or more of a power diode, a thyristor, an IGBT, and an IGCT which are combined in series and parallel.

* * * * *